United States Patent
Andersson et al.

(10) Patent No.: US 7,153,385 B2
(45) Date of Patent: Dec. 26, 2006

(54) METHOD AND DEVICE FOR PRODUCING A MULTI-PLY PRINTED WEB OF FLEXIBLE MATERIAL, SUCH AS PAPER AND NONWOVEN, AND MULTI-PLY MATERIAL PRODUCED BY THE METHOD

(75) Inventors: Anders Andersson, Stenungsund (SE); Anna Mansson, Molndal (SE); Eva-Li Saarvali, Vastra Frolunda (SE); Wolfgang Hof, Frankfurt am Main (DE); Ferdinand Hein, Mannheim (DE)

(73) Assignee: SCA Hygiene Products AB, Gothenburg (SE)

( * ) Notice: Subject to any disclaimer, the term of this patent is extended or adjusted under 35 U.S.C. 154(b) by 26 days.

(21) Appl. No.: 10/725,536

(22) Filed: Dec. 3, 2003

(65) Prior Publication Data

US 2004/0121133 A1    Jun. 24, 2004

Related U.S. Application Data

(60) Provisional application No. 60/434,404, filed on Dec. 19, 2002.

(51) Int. Cl.
*B32B 38/14* (2006.01)
(52) U.S. Cl. ............ 156/277; 156/291; 156/209; 156/324; 162/112
(58) Field of Classification Search ............ 101/5, 101/22; 428/211.1
See application file for complete search history.

(56) References Cited

U.S. PATENT DOCUMENTS

| | | | | |
|---|---|---|---|---|
| 3,684,641 A | * | 8/1972 | Murphy | 428/154 |
| 3,867,225 A | * | 2/1975 | Nystrand | 156/209 |
| 4,376,671 A | * | 3/1983 | Schulz | 156/549 |
| 5,339,730 A | * | 8/1994 | Ruppel et al. | 101/32 |
| 5,503,076 A | * | 4/1996 | Yeo | 101/483 |
| 6,113,723 A | * | 9/2000 | McNeil et al. | 156/209 |
| 6,361,601 C1 | * | 3/2002 | Schultz | 118/70 |
| 2003/0198788 A1 | * | 10/2003 | Andersson et al. | 428/195.1 |
| 2004/0062916 A1 | * | 4/2004 | Mansson et al. | 428/198 |

FOREIGN PATENT DOCUMENTS

| | | |
|---|---|---|
| EP | 0 738 588 | 10/1996 |
| EP | 0 796 727 | 9/1997 |
| FR | 1 275 190 | 9/1961 |
| FR | 2 824 778 | 11/2002 |
| FR | 2824778 | * 11/2002 |
| WO | WO 01/23100 | 4/2001 |
| WO | WO 01/39861 | 6/2001 |

* cited by examiner

*Primary Examiner*—Jessica Rossi
(74) *Attorney, Agent, or Firm*—Young & Thompson

(57) ABSTRACT

Method for producing a multi-ply web of flexible material, such as paper and nonwoven material, comprising at least one first and one second ply which are interconnected by gluing in a plurality of discrete glue sites. The web is printed with at least one printing pattern which is in register with the glue pattern. The multi-ply web is produced by bringing a first ply in contact with a patterned glue transfer roll, transferring glue to the first ply in a glue pattern, a second ply is brought in contact with the glue applied side of the first ply in a press nip between a patterned lamination roll and an impression roll, the glue transfer roll and the lamination roll being in register with each other and having corresponding patterns.

20 Claims, 4 Drawing Sheets

METHOD AND DEVICE FOR PRODUCING A MULTI-PLY PRINTED WEB OF FLEXIBLE MATERIAL, SUCH AS PAPER AND NONWOVEN, AND MULTI-PLY MATERIAL PRODUCED BY THE METHOD

CROSS-REFERENCE TO RELATED APPLICATION

This application claims the 35 USC 119 (e) benefit of Provisional Application 60/434,404 filed on 19 Dec. 2002.

FIELD OF THE INVENTION

The present invention refers to a method for producing a multi-ply web of flexible material, such as paper and nonwoven material, by means of gluing the plies. Especially it refers to production of tissue products such as toilet and kitchen paper, paper towels, hand towels, napkins, handkerchiefs, wiping material and the like. The invention further refers to a multi-ply web of flexible material, such as paper and nonwoven, comprising at least a first and a second ply, which are interconnected by means of gluing in spots.

BACKGROUND OF THE INVENTION

It is very common to laminate two or more tissue plies in order to produce the final tissue product. Herewith a more flexible and softer tissue product is obtained as compared to if one single ply with a corresponding thickness and basis weight had been produced as for the laminated product. The absorbent capacity and the bulk are moreover improved.

The lamination of two or more tissue plies is often made by means of gluing. A mechanical embossing of the plies is also often performed before they are glued together. It is further known to laminate two plies only by means of a mechanical embossing, at which a mechanical joining of the plies occurs in the embossing sites.

Through for example EP-A-796 727 it is known to first emboss two paper plies in a three dimensional structure with alternating raised and recessed portions, after which glue is applied to one of the plies and the two plies are joined in a press nip between two embossing rolls, so that the raised portions of the respective plies are glued to each other. A similar embossing procedure is shown in EP-A-738 588, according to which the glue also has a colouring effect.

In WO 95/08671 there is disclosed an example of so called nested embossing, in which the two individually embossed plies are combined and joined with the raised portions of one ply nesting into the recessed portions of the opposite ply.

Through U.S. Pat. No. 5,443,889 there is known a procedure for laminating two paper plies, which are fed over a pattern roll each, said pattern rolls having alternating raised and recessed portions and where glue is applied to one ply while this is led over the roll. The two paper plies are then glued together in a nip between the two pattern rolls, which are in register with each other so that a joining and compression of the paper plies occurs in a pattern corresponding to the raised portions of the pattern rolls.

A drawback that occurs in connection with embossing a paper web where this is compressed in spots, is that a considerable strength reduction occurs in the embossing sites, which affects the strength properties of the entire paper product. Strength reductions of up to 70% of an embossed paper as compared to a corresponding unembossed paper are not unusual.

In Swedish patent application no. 0200590-8 there is disclosed a method for producing a multi-ply paper or nonwoven material, by means of gluing the plies wherein a glue transfer roll and a lamination roll are driven in register. The glue transfer roll and the lamination roll have corresponding patterns of protuberances so that the plies are glued together in a pattern corresponding to the configuration of the protuberances.

Printing of tissue paper is often made for aesthetical reasons. The printing pattern could be any pattern including more or less continuous lines, line segments, dots, trademarks, logotypes, symbols, fantasy characters etc. In a multi-ply web material printing is usually made on the outside of the multi-ply web, but may also be on the inner side of one ply, wherein it is visible through the ply.

OBJECT AND SUMMARY OF THE INVENTION

The object of the present invention is to provide a method for producing a printed multi-ply web of flexible material, such as paper and nonwoven material, wherein at least two plies of flexible material are laminated together by gluing and which provides a high flexibility in creating. printing patterns and combinations of printing patterns and/or combinations of glue patterns and printing patterns.

This has according to the invention been provided by a method, comprising the steps of bringing a patterned glue transfer roll, having a pattern of protuberances, in contact with a glue application device, transferring glue to a first web shaped flexible material in a glue pattern corresponding to the configuration of the protuberances, a second web shaped flexible material being brought in contact with the glue applied side of said first web shaped flexible material in a press nip between a patterned lamination roll and an impression roll, said lamination roll having a pattern of protuberances corresponding to said glue pattern, the glue transfer roll and the lamination roll being in register with each other, so that the first and second web shaped flexible materials are combined and glued together in a pattern corresponding to the configuration of the protuberances, wherein the first web shaped flexible material and/or the second web shaped flexible material is printed by a printing roll carrying a colorant in a selected pattern, said printing is performed in register with the glue transfer while the first and/or second web shaped flexible materials are residing on said impression roll.

In one embodiment the first web shaped flexible material is printed before it is laminated to the second web shaped flexible material, wherein the printed pattern is printed on the inside of the first web shaped flexible material, i.e. the side facing the second web shaped flexible material. According to one aspect of this embodiment two or more patterns are printed in subsequent steps on said first web shaped flexible material before it is laminated to the second web shaped flexible material, said patterns being printed in register with each other and with the glue pattern.

In a further embodiment the second web shaped flexible material is printed after or simultaneously with lamination to the first web shaped flexible material, wherein the printed pattern is printed on the outside of the second first web shaped flexible material. According to one aspect of this embodiment two or more patterns are printed in subsequent steps on said second web shaped flexible material after or simultaneously with lamination to the first web shaped flexible material, said patterns being printed in register with each other and with the glue pattern.

According to one embodiment at least two printing stations are provided, wherein at least one first printing station prints at least one first pattern on the first web shaped flexible material before it is laminated to the second web shaped flexible material, and at least one printing station prints at least one second pattern on the second web shaped flexible material after or simultaneously with lamination to the first web shaped flexible material.

In one embodiment the glue is a coloured glue, wherein said coloured glue pattern will appear as a printed pattern. At least one printing pattern can be the same as and printed on the next web shaped flexible material just on top of the coloured glue pattern. The at least one printing pattern and said glue pattern may be of different colours, wherein a "two-sided product" will be provided. The coloured glue pattern and the printing pattern(s) may further be different.

According to further embodiments at least two different printing patterns are provided.

In one embodiment of the invention at least one of the plies before lamination with the opposite ply is exerted to a three-dimensional patterning.

In a further embodiment the multi-ply web is embossed after lamination.

The size of each glue site should amount to between 0.15 and 150, preferably between 0.5 and 100 mm$^2$, more preferably between 1 and 15 mm$^2$. The number of glue sites per area unit should amount to between 25 and 350,000, preferably between 300 and 180,000 and more preferably between 800 and 50,000 glue sites per m$^2$. It is pointed out that the glue sites may be regularly distributed over the area of the web shaped material, but they may also be irregularly distributed, for example arranged in groups spaced apart.

The term sites in this respect refers to any shape of the glue sites, such as small points, lines, figures, letters, fantasy patterns or any desired shape. The invention further refers to a multi-ply web of flexible material, such a paper and nonwoven, comprising at least one first and one second ply which are interconnected by gluing in a plurality of discrete glue sites, wherein the web is printed with at least one printing pattern which is in register with the glue pattern and wherein the printing pattern and the glue pattern are either overlapping or non-overlapping.

In one embodiment at least one printing pattern is printed on the inner side of at least one ply and is visible from the outside of the multi-ply product.

In one embodiment at least one printing pattern is printed on the outside of at least one ply.

According to a further embodiment at least one printing pattern is printed on the inner side of at least one ply and at least one printing pattern is printed on the outside of at least one ply.

Further features of the invention are disclosed in the following description and in the claims.

BRIEF DESCRIPTION OF THE DRAWINGS

The invention will in the following be closer described with reference to some embodiments shown in the accompanying drawings.

DETAILED DESCRIPTION OF THE INVENTION

Figure 1:
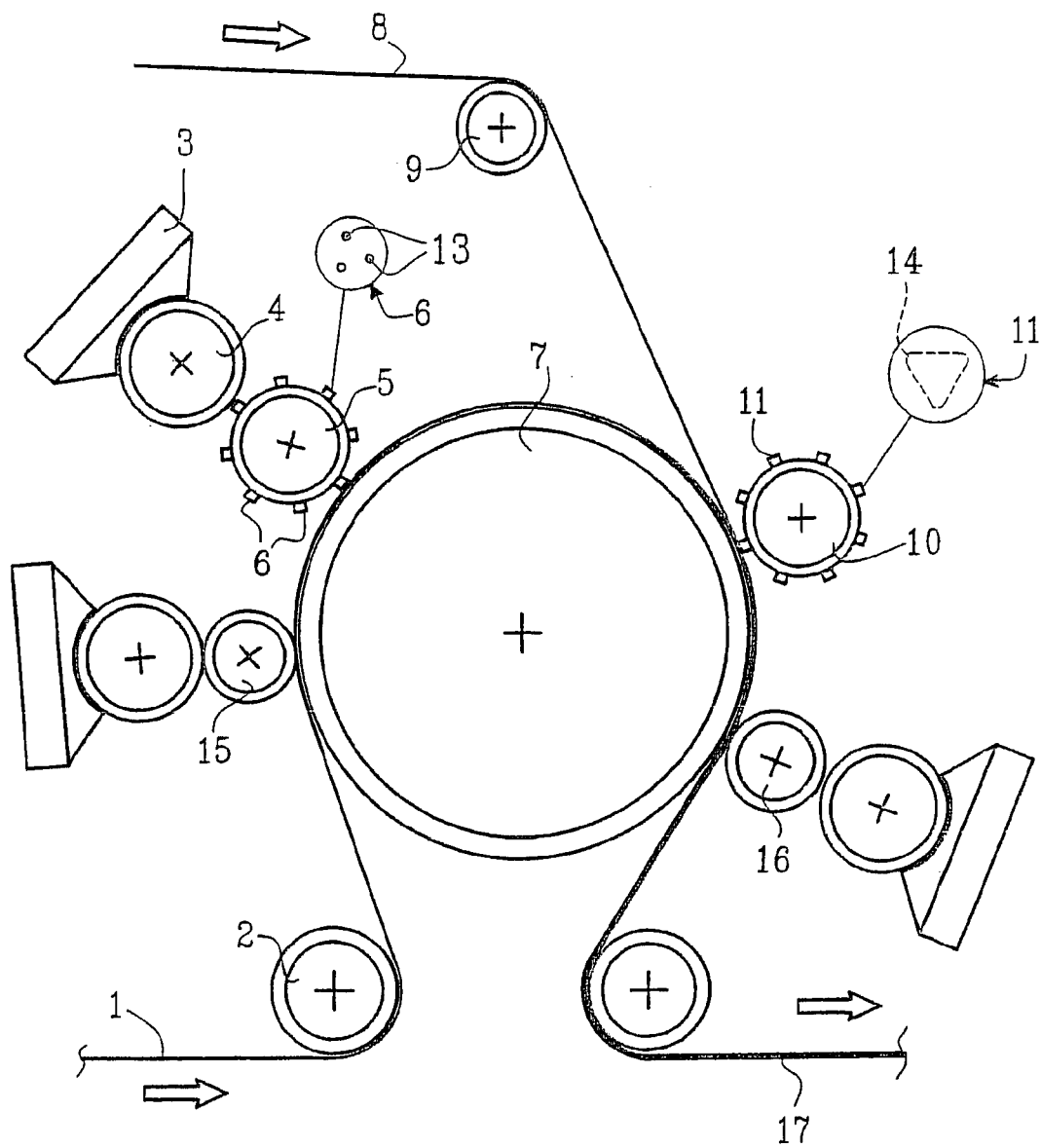
FIG. 1 shows a schematic side view of a first embodiment of a device for performing the method according to the invention.

FIG. 1 shows a device for producing a two-ply material, of for example paper, especially tissue paper. A first paper web 1 is fed over a roll 2 and an impression roll 7. While residing on the impression roll 7 the first paper web 1 is printed by a printing roll 15 carrying a colorant in a selected pattern. The printing unit may be a flexographic printing device or any optional printing device adapted to print on paper or nonwoven. The first paper web is then fed towards a glue application station. This comprises a glue chamber 3 from which glue is applied on a glue roll 4. The glue roll 4 is in contact with a first patterned glue transfer roll 5, which along its periphery is provided with a pattern of protuberances 6. The glue roll 4 is only contacting the tops of the protuberances 6, so that glue is applied only thereon. The paper web 1 is passed into a press nip between the glue transfer roll 5 and the centrally placed impression roll 7. Glue will thus be applied to the first paper web 1 in a pattern corresponding to the configuration of the tops of the protuberances 6. The printing roll 15 is driven in register with the glue transfer roll 5. The printing pattern is in register with and preferably not overlapping with the glue pattern.

The term "in register with" generally refers to that two or more patterns are applied with fixed relationship to each other, and are either overlapping or non-overlapping. The term "overlapping" includes that the patterns are located just above each other or are only partly covering each other.

The pressure in the press nip between the glue transfer roll 5 and the impression roll 9 is low and only sufficiently high to accomplish a transfer of glue to the paper web 1. According to one aspect of the invention no or only a slight deformation of the paper web takes place, i.e. no distinct impression of the protuberances 6 of the glue transfer roll 5 into the paper web will occur.

Figure 2:
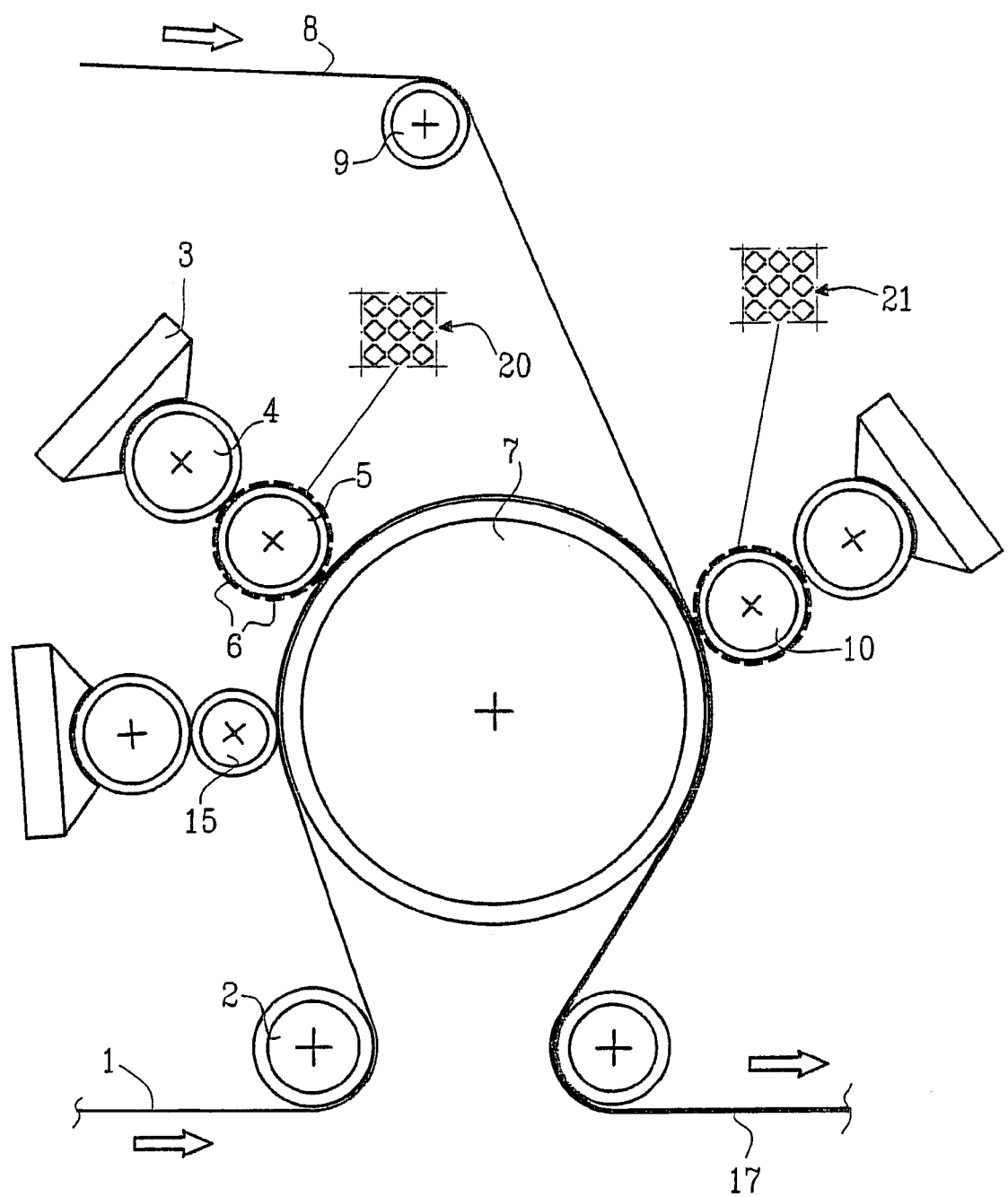
FIG. 2 shows a schematic side view of a second embodiment of a device for performing the method according to the invention.

A second paper web 8 is fed over a roll 9 and into a press nip between a patterned lamination roll 10 and the centrally placed impression roll 7. The lamination roll 10 has a three dimensional pattern of protuberances 11 corresponding to the pattern of the protuberances 6 on the glue transfer roll 5. The term "corresponding to" in this respect means that the protuberances 11 either have the same shape and size of the effective surface area as the protuberances 6 of the glue transfer roll 5, the same shape but a larger effective surface area than the protuberances 6 of the glue transfer roll 5 so as to extend outside the outer circumference of the glue sites provided by the glue transfer roll 5, or a different shape and a larger effective surface area than the protuberances 6 of the glue transfer roll 5. For example a glue pattern 12 provided by the first pattern roll 5 may be in the form of groups of three dots 13 arranged in a triangular pattern as shown in FIGS. 1 and 2, wherein the protuberances 11 of the lamination roll 10 may either be exactly the same as or slightly larger than the glue pattern, or may for example be in the form of a triangle 14 covering the three dots. In all these cases the relative positions of the patterns on the glue transfer roll 5 and the lamination roll 10 are in correspondence with each other.

The glue transfer rolls 5 and the lamination roll 10 are driven in register with each other so that the first and second paper webs 1 and 8 are pressed and glued together in a pattern corresponding to the configuration of the glue pattern provided by the glue transfer roll 5.

It is preferred that one centrally impression roll 7 is used for both the glue transfer roll 5 and the lamination roll 10, as is shown in FIG. 1. However it would of course also be possible to use two separate impression rolls and to synchronize them so that they are driven in register.

Also in this second press nip the pressure should be sufficiently high to provide a gluing together of the two paper webs 1 and 8. The pressure in the second press nip should preferably not be higher than to cause only slight compacting impressions just opposite the glue sites in the second ply 8 facing the lamination roll 10.

The opposite external surface of said multi-ply web, i.e. the surface facing the central impression roll 7 will substantially maintain its structure unaffected by the lamination process with no compacting impressions in the material opposite the glue sites.

The pattern on the glue transfer roll 5 can be optional, but should be chosen so that glue is applied to the paper web 1 in an amount corresponding to between 0.03 and 9%, preferably between 0.1 and 6% of the total surface area of the paper web 1. In the present case the glue sites 13 are sparsely distributed over substantially the entire area of the laminated product. It is with the method according to the invention possible to provide a very distinct positioning of the glue sites 13, wherein a very small amount of glue is needed. This means advantages with respect to softness, drapability, absorption etc. The number of glue sites 13 per area unit should amount to between 25 and 350,000 glue sites per $m^2$, preferably between 300 and 180,000 glue sites per $m^2$ and more preferably between 800 and 50,000 glue sites per $m^2$. The size of each glue site 13 should amount to between 0.15 and 150 $mm^2$, preferably between 0.5 and 100 $mm^2$ and more preferably between 1 and 15 $mm^2$.

In the case of large glue sites 13 screened patterns can be used, which means that each glue pattern unit is built up of a plurality of small screen dots. The size of the glue site in this case is defined as the circumscribed area of the combination of screen dots forming a glue pattern unit.

Preferred glues are the ones commonly used for paper, such as carboxy methyl cellulose (CMC), polyvinyl alcohol (PVOH), ethylene vinyl acetate (EVA), polyvinyl acetate (PVAc), ethylene acrylic acid, vinyl acetate acrylic acid, styrene acrylic acid, polyurethane, polyvinylidene chloride, starch, chemically modified starch, dextrine, water soluble polymers such as latexes and milky colloids in which natural or synthetic rubber or plastic is suspended in water. In case the material webs are of other material than paper glues suited for these materials are of course chosen.

It is preferred that glues having a relatively high dry content are used, since this enables a distinct positioning of the glue sites.

Coloured glues may also be used, which give a visual effect and therewith a patterning effect to the material. The printing pattern provided by the printing roll 15 will appear on the inside of the laminated multi-ply product, and will be visible through the plies.

A second printing roll 16 is arranged after the lamination roll 10 for printing on the outside of the second web shaped material 8. This second printing unit may also be a flexographic printing device or any optional printing device adapted to print on paper or nonwoven. The second web shaped flexible material 8 is printed while residing on the central impression roll 7 and the printing roll 16 is driven in register with the glue transfer roll 5, the lamination roll 10 and the first printing roll 15. The second printing pattern is printed on the outside of the second web shaped material 8 and may or may not overlap with the glue pattern and/or the first printing pattern. It may further be printed on top of the glue pattern.

In alternative embodiments of the invention only one printing roll is provided, wherein either the first or the second printing roll 15 or 16 is eliminated. In further embodiments two or more printing rolls may be provided, which print two or more patterns in subsequent steps on the first web shaped flexible material 1 before it is laminated to the second web shaped flexible material 8. The patterns are printed in register with each other. In still further embodiments two or more printing rolls may be provided, which print in subsequent steps on the second web shaped flexible material 8 after lamination to the first web shaped flexible material 1, the patterns being printed in register with each. The lamination roll 10 may further act as a printing roll carrying a colorant in a selected pattern, which is printed on the outside of the laminated product. This is shown in the embodiment of FIG. 2.

Thus it is understood that the invention provides a plurality of possibilities to create printing patterns and combinations of printing patterns. In case a coloured glue is used, the glue pattern also contributes to the patterning effect of the product.

Figure 3:
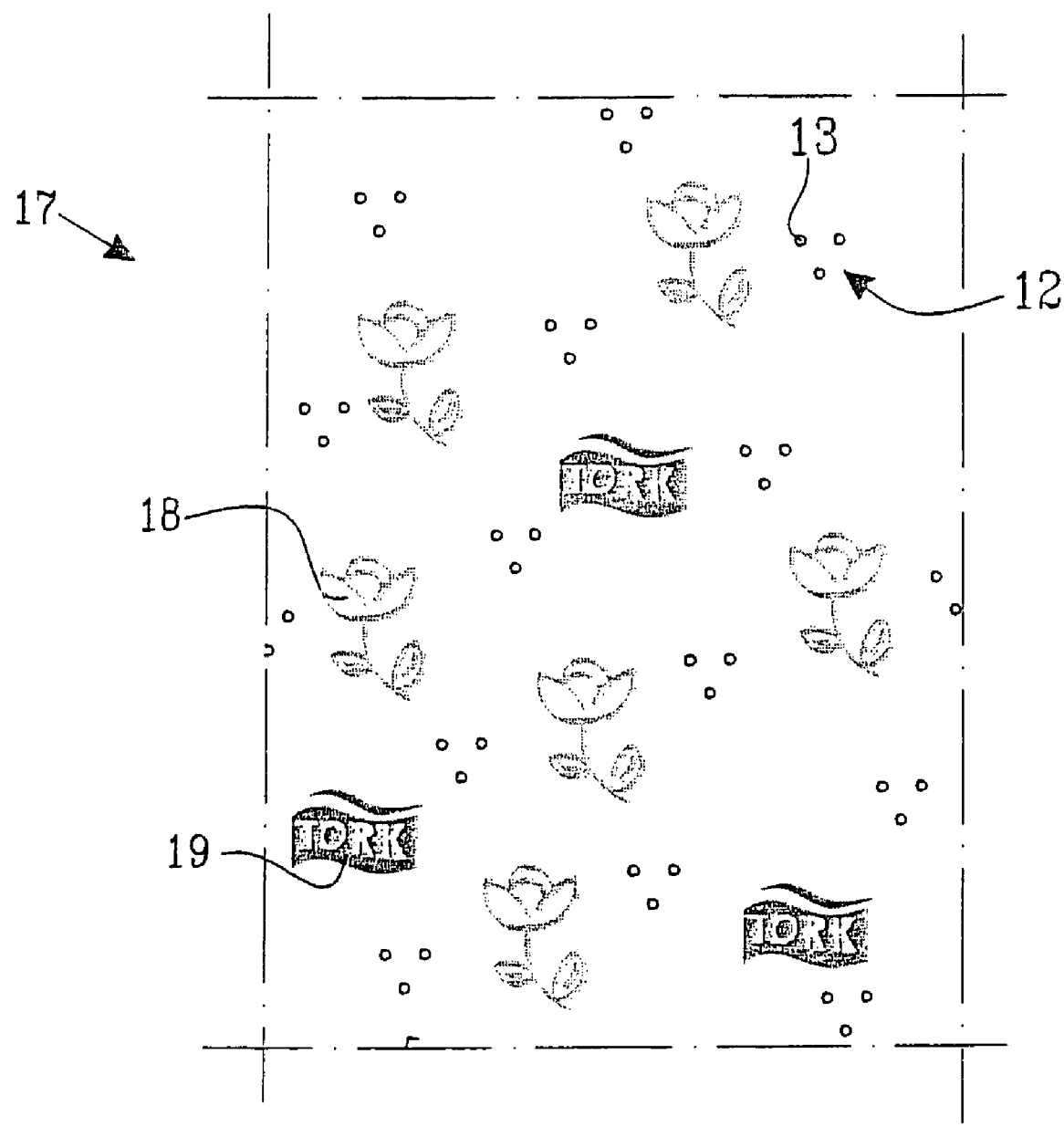
FIG. 3 is a plan view of one embodiment of a multi-ply web according to the invention.

FIG. 3 shows an example of a multi-ply web 17 made with a device according to the device shown in FIG. 1. The glue pattern 12 is in the form of groups of three dots 13 arranged in a triangular configuration. The glue pattern may be coloured or colourless, so that it either does or does not form part of the patterning effect of the multi-ply web. A first printed pattern 18 in the form of a figurative pattern is printed on the inside of the multi-ply web and visible through the plies. It is preferred that said first printed pattern 18 looks good from both sides of the multi-ply web. A second printed figurative pattern 19 in the form of a logotype is provided on the outside of the multi-ply web.

FIG. 2 shows a modified embodiment of a device for making a multi-ply product according to the invention. The first paper web 1 is printed by a printing roll 15, carrying a colorant in selected pattern. In a next step glue is transferred to the first paper web 1 by a glue transfer roll 5 transferring glue to the web 1 in a selected glue pattern. The second paper web 8 is laminated to the first paper web by the lamination roll 10 having a pattern of protuberances corresponding to the glue pattern and driven in register with the glue transfer roll 5. The lamination roll 10 in this embodiment is also acting as a printing roll, such as a flexographic printing device or any optional printing device adapted to print on paper or nonwoven. Thus the combined printing/lamination roll 10 prints a printing pattern on the outside of the laminated multi-ply product 17. In the embodiment shown this printing pattern is identical to and printed on the second paper web 8 on top of the glue pattern on the first paper web 1 provided by the glue transfer roll 5. It is also understood that the printing pattern provided by the combined printing/lamination roll 10 may be different from the glue pattern as described in connection with the embodiment of FIG. 1 as long as it covers the glue pattern and thus provides a lamination of the plies.

Figure 4:
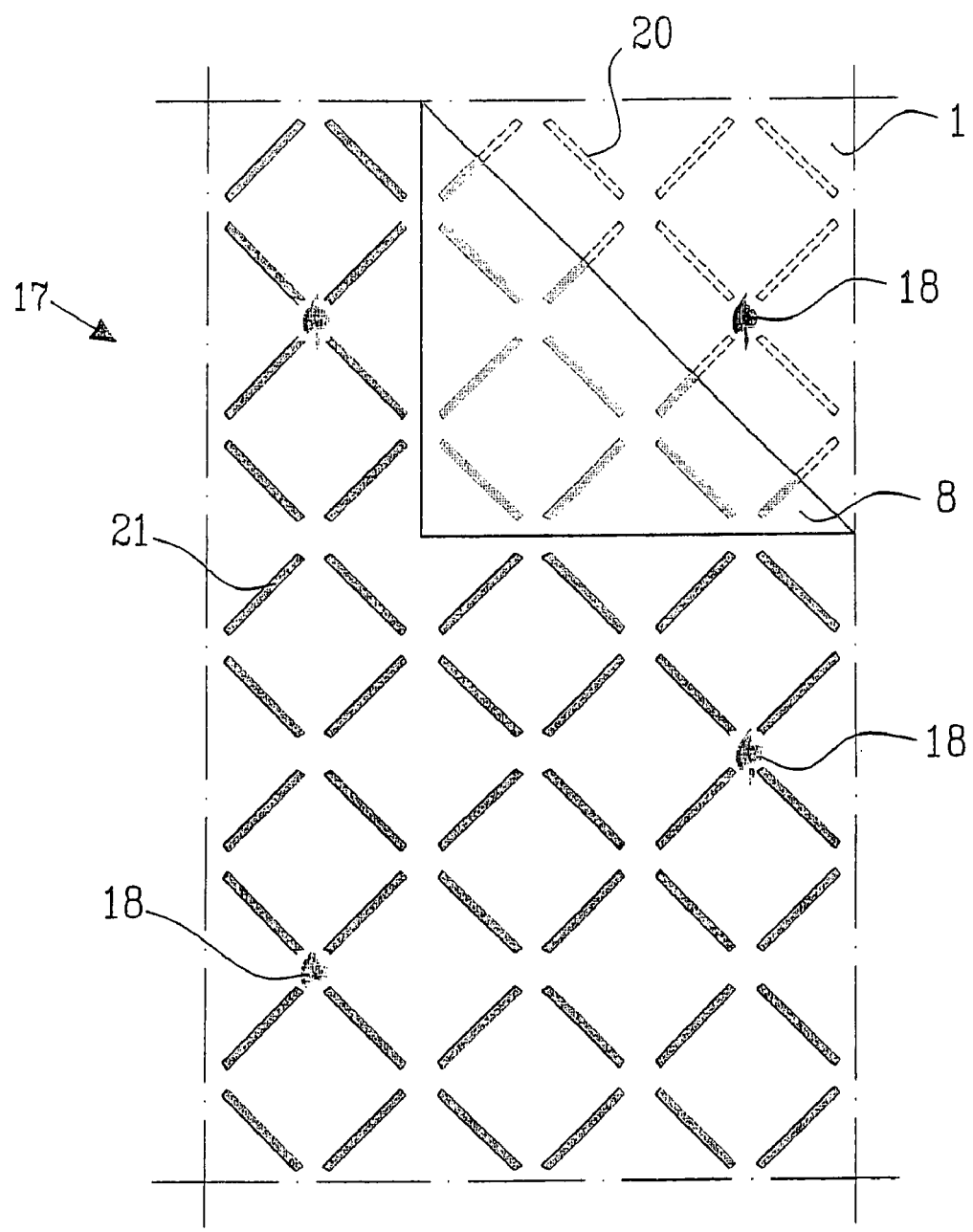
FIG. 4 is a plan view of a further embodiment of a multi-ply web according to the invention.

In case a coloured glue is used for providing the glue pattern, the glue pattern will also form a visible printing pattern which can be seen from the outside of the multi-ply product. Further if different colours are used for the coloured glue and for the identical printing pattern provided by the combined printing/lamination roll 10 respectively, the latter being applied on the outside of the multi-ply product, a "two-sided" product will be provided. This means that the product will look different from different sides, since from one side more or less only the coloured glue pattern 20 will be visible, while from the opposite side more or less only the identical printing pattern 21 will be visible. This is illustrated in FIG. 4. The first printing pattern provided by the first printing roll 15, for example a decorative figure, is denoted 18.

A two-sided product may be desirable in cases where the opposite sides of the product have different properties, for example one soft, smooth and absorbent side and one side for example having a more rough surface adapted for cleaning and/or a surface having a three-dimensional structure suited for wiping viscous fluids.

The paper webs 1 and 8 that are laminated can be either smooth but also have a three-dimensional structure provided earlier in the process, for example during forming, dewatering and/or drying of the paper web. A three-dimensional structure may also be provided by embossing the dry paper webs before lamination. The method according to the invention is very lenient to such a pattern, so that this is maintained substantially intact throughout the laminating process. The paper webs 1 and 8 laminated together may be of the same or different type. For example, as explained above, a two-sided product may be provided where different sides of the multi-ply product have different properties.

Another important advantage of the invention is that the paper substantially maintains its strength properties through the process, which in many other lamination processes, in which an embossing and deformation of the paper webs occur in connection with lamination, are decreased. Because of the substantially smooth structure of the laminated multi-ply product this can be converted into dense rolls or folded products, which means space and cost saving.

The laminated multi-ply product may also if desired, due to the strong ply bonding provided by the glue spots, be embossed after the lamination process, thereby creating a softer material. Preferably a relatively dense embossing pattern having a relatively small embossing depth is used, for example a so called "micro quilted embossing pattern, so as to not disturb the appearance of the printed pattern. It is also possible to use a macro embossing pattern.

Three or more paper plies may of course be laminated with the method described above. Two or more glue stations may therefore be provided, which are driven in register and/or two or more plies may enter the first and/or further press nips.

Different kind of paper with different properties with respect to absorption capacity, basis weight, manufacturing technique, fiber composition, chemical additives may be used in the different plies.

The method is further suitable to use for paper plies having holes therein, since the main part of the holes will be intact throughout the lamination process and not be filled with glue, which normally is the case when gluing the plies together.

The invention claimed is:

1. Method for producing a multi-ply web of flexible material, at a plurality of glue sites, which comprises:
    by gluing the plies bringing a patterned glue transfer roll, having a pattern of protuberances, in contact with a glue application device;
    transferring glue to a first web shaped flexible material in a glue pattern corresponding to the configuration of the protuberances;
    bringing a second web shaped flexible material in contact with the glue applied side of said first web shaped flexible material in a press nip between a patterned lamination roll and an impression roll; said lamination roll having a pattern of protuberances corresponding to said glue pattern; the glue transfer roll and the lamination roll being in register with each other, so that the first and second web shaped flexible materials are combined and glued together in a pattern corresponding to the configuration of the protuberances of the glue transfer roll, wherein the first web shaped flexible material is printed with a printed pattern by a printing roll carrying a colorant in a selected pattern, wherein the printing occurs before the first web shaped flexible material is laminated to the second web shaped flexible material and the printed pattern is printed on an inner side of the first web shaped flexible material facing the second web shaped flexible material; wherein said printing is performed in register with the glue transfer while the first web shaped flexible material is residing on said impression roll, and wherein the printing and the glue transferring are separate and discrete steps effectuated by separate structures.

2. Method as claimed in claim 1, wherein two or more patterns are printed in subsequent steps on said first web shaped flexible material before it is laminated to the second web shaped flexible material, said patterns being printed in register with each other and with the glue pattern.

3. Method as claimed in claim 1, wherein the size of each glue site amounts to between 0.15 and 150 mm$^2$.

4. Method as claimed in claim 1, wherein the number of glue sites per unit area amounts to between 25 per m$^2$ to 150 per cm$^2$.

5. Method as claimed in claim 1, wherein the pattern configuration of the glue transfer roll is chosen so that glue is applied to said first ply in glue sites covering an area corresponding to between 0.03 and 9% of the total area of the first web shaped flexible material and sparsely distributed over substantially the entire area of the first web shaped flexible material.

6. Method as claimed in claim 1, wherein at least one of the plies before lamination with the opposite ply is exerted to a three dimensional patterning provided on the ply while wet, during drying of the wet ply and/or in dry state.

7. Method as claimed in claim 1, wherein the multi-ply web after lamination is embossed.

8. Method as claimed in claim 1, wherein any of said web shaped flexible materials comprises one or more plies of flexible material.

9. Method as claimed in claim 1, wherein said second web shaped flexible material is printed after or simultaneously with the lamination to the first web shaped flexible material, wherein the colored printed pattern is printed on the outside of the second web shaped flexible material.

10. Method as claimed in claim 9, wherein two or more patterns are printed in subsequent steps on said second web shaped flexible material after or simultaneously with the lamination to the first web shaped flexible material, said patterns being printed in register with each other and with the glue pattern.

11. Method as claimed in claim 1, wherein at least two printing stations are provided; at least one first printing station prints at least one first pattern on the first web shaped flexible material before it is laminated to the second web shaped flexible material; and at least one second printing station prints at least one second pattern on the second web shaped flexible material after lamination to the first web shaped flexible material.

12. Method as claimed in claim 11, wherein the at least one first printing pattern and the at least one second printing pattern are different.

13. Method as claimed in claim 1, wherein the glue is a coloured glue, and a coloured glue pattern will appear as a printed pattern.

14. Method as claimed in claim 13, wherein the coloured glue pattern and the printing pattern are different.

15. Method as claimed in claim 13, wherein a printing pattern is the same as the colored glue pattern and printed on the second web shaped flexible material just on top of the coloured glue pattern on the first web shaped flexible material.

16. Method as claimed in claim 15, wherein said printing pattern and said glue pattern are of different colour.

17. A method for producing a multi-ply web of flexible material, at a plurality of glue sites, comprising the steps of:

transferring glue from a patterned glue transfer roll having a pattern of protuberances to a first web shaped flexible material in a glue pattern corresponding to the configuration of said protuberances;

laminating a second web shaped flexible material with said first web shaped flexible material by contacting said second web shaped flexible material with said glue pattern of said first web shaped flexible material in a press nip between a patterned lamination roll and an impression roll, said lamination roll having a pattern of protuberances corresponding to said glue pattern and said press nip;

driving said lamination roll in register with said patterned glue transfer roll, so that the first and second web shaped flexible materials are combined and glued together in a pattern corresponding to the configuration of said protuberances of said patterned glue transfer roll; and printing a colorant in a selected pattern on said second web shaped flexible material simultaneously at said press nip with said laminating step such that a colored printed pattern is located on the outside of the second web shaped flexible material that is in a fixed relationship with said glue pattern.

18. The method of claim 17, comprising the further steps of:

printing a colorant in a selected pattern on said first web shaped flexible material prior to said laminating step, so that a colored printed pattern is located on the inner side of the first web shaped flexible material facing the second web shaped flexible material.

19. The method of claim 18, wherein, said printing of said first web shaped flexible material is performed by a printing roll having a selected pattern carrying said colorant, and said printing roll is in register with said patterned glue transfer roll to provide said colored printed pattern in a fixed relationship with said glue pattern on said first web flexible material.

20. The method of claim 18, wherein, said printing of said first web shaped flexible material is performed by a patterned glue transfer roll, said glue is a colored glue, and said colored printed pattern is a colored glue pattern.

* * * * *